US009864132B1

(12) United States Patent
Augur et al.

(10) Patent No.: US 9,864,132 B1
(45) Date of Patent: Jan. 9, 2018

(54) SILICON WAVEGUIDE DEVICES IN INTEGRATED PHOTONICS

(71) Applicant: GLOBALFOUNDRIES INC., Grand Cayman (KY)

(72) Inventors: Roderick A. Augur, Saratoga Springs, NY (US); Ajey Poovannummoottil Jacob, Watervliet, NY (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 15/282,320

(22) Filed: Sep. 30, 2016

(51) Int. Cl.
*G02B 6/12* (2006.01)
*H01L 23/373* (2006.01)
*H01L 27/092* (2006.01)

(52) U.S. Cl.
CPC .............. *G02B 6/12* (2013.01); *H01L 23/373* (2013.01); *G02B 2006/12061* (2013.01); *G02B 2006/12135* (2013.01); *H01L 23/3733* (2013.01); *H01L 23/3738* (2013.01); *H01L 27/092* (2013.01)

(58) Field of Classification Search
None
See application file for complete search history.

(56) References Cited

U.S. PATENT DOCUMENTS

| 6,882,782 | B2 | 4/2005 | Conzone et al. | |
|---|---|---|---|---|
| 8,885,996 | B2 * | 11/2014 | Li | G02B 6/29308 385/31 |
| 2015/0301283 | A1 * | 10/2015 | Bi | G02B 6/29398 385/40 |

FOREIGN PATENT DOCUMENTS

WO 2015160495 10/2015

OTHER PUBLICATIONS

Hirota et al., "Novel glass system with negative temperature coefficient of refractive index and its application to arrayed waveguide grating", Feb. 23-27, 2004, 3 pages.
Teng, et al., Athermal Silicon-on-insulator ring resonators by overlaying a polymer cladding on narrowed Waveguides, Published in Optics Express, vol. 17, No. 17, 2009, 7 pages.
Lind, "Two Decades of Negative Thermal Expansion Research: Where Do We Stand?", Department of Chemistry, the University of Toledo, Jun. 20, 2012, 5, 30 pages.
Yoon et al., "Negative Thermal Expansion Coefficient of Graphene Measured by Raman Spectroscopy", Nano Lett., 2011, 21 pages.
Djordjevic et al., "CMOS—compatible, athermal silicon ring modulators clad with titanium dioxide", Optics Express, Jun. 17, 2013, vol. 21, No. 12, 11 pages.

* cited by examiner

*Primary Examiner* — Sung Pak
(74) *Attorney, Agent, or Firm* — Michael LeStrange; Andrew M. Calderon; Roberts Mlotkowski Safran Cole & Calderon, P.C.

(57) ABSTRACT

The present disclosure relates to semiconductor structures and, more particularly, to silicon waveguide devices in integrated photonics and methods of manufacture. The integrated photonics structure includes: a localized region of negative thermal expansion (NTE) coefficient material formed within a trench; at least one photonics or CMOS component contacting with the negative thermal expansion (NTE) coefficient material; and cladding material formed above the at least one photonics or CMOS component.

17 Claims, 4 Drawing Sheets

SILICON WAVEGUIDE DEVICES IN INTEGRATED PHOTONICS

FIELD OF THE INVENTION

The present disclosure relates to semiconductor structures and, more particularly, to silicon waveguide devices in integrated photonics and methods of manufacture.

BACKGROUND

Integrated Si photonics is seen as a promising emerging technology to meet the industry imperative to reduce energy dissipated/bit for data transfer. A common integrated technology for Si photonics uses Si waveguides, formed on deep BOX SOI (buried oxide in silicon on insulator technology) (2 um thick) and cladded or encapsulated with $SiO_2$. A common device used with Si photonics is the micro-ring, which can be used for modulators, ADD/drop filters, and MUX/DEMUX, due to its compact size.

The micro-ring is a resonant device tuned to a particular wavelength, and is hence very sensitive to thermal effects (e.g., from nearby analog drive circuits of logic). For example, if the ring expands due to heating, it is no longer tuned to the desired wavelength. To reduce impacts of temperature changes, heaters are built into the integrated photonics stack under or over the micro-rings. For example, as Si shows a strong dependency of optical properties on temperature, heaters can be used to control component temperature.

However, the heaters have many drawbacks such as dissipation of power, which is in conflict with the imperative to reduce energy/bit for data transfer. Also, the heaters require significant additional energy, exhibit unidirectional heating only, and they are difficult to be applied for practical use in integrated photonic systems. In addition, forming the heaters requires additional process steps. Furthermore, control of the temperature requires additional active circuitry, which adds yet more processing steps and complexity in the Si photonics chips/substrate.

SUMMARY

In an aspect of the disclosure, an integrated photonics structure comprises: a localized region of negative thermal expansion (NTE) coefficient material formed within a trench; at least one photonics or CMOS component contacting with the negative thermal expansion (NTE) coefficient material; and cladding material formed above the at least one photonics or CMOS component.

In an aspect of the disclosure, an integrated photonics structure comprises: at least one photonics or CMOS component on a substrate; an encapsulating material encapsulating the at least one photonics or CMOS component; and a region of negative thermal expansion (NTE) coefficient material which is located to reduce impact of temperature changes on performance of the at least one photonics or CMOS component.

In an aspect of the disclosure, an integrated photonics structure comprises: at least one photonics or CMOS component on a substrate; an encapsulating material encapsulating the at least one photonics or CMOS component; and a negative thermal expansion (NTE) coefficient material mixed with a host material surrounding the at least one photonics or CMOS component.

BRIEF DESCRIPTION OF THE DRAWINGS

The present disclosure is described in the detailed description which follows, in reference to the noted plurality of drawings by way of non-limiting examples of exemplary embodiments of the present disclosure.

DETAILED DESCRIPTION

The present disclosure relates to semiconductor structures and, more particularly, to silicon waveguide devices in integrated photonics and methods of manufacture. More specifically, the present disclosure relates to structures and methods to reduce temperature sensitivity of Si waveguide devices in integrated photonics. Advantageously, the present disclosure reduces the impact of temperature changes by using selected materials with Negative Thermal Expansion coefficient (NTE). These materials will reduce the impact of temperature changes on the component critical performance (e.g. resonance shift), thereby reducing or eliminating the need for heaters and control circuits used in current integrated Si photonics which, in turn, significantly reduces energy dissipation/bit of data transferred.

In embodiments, the NTE materials can be ceramic type materials which best maintain their NTE characteristics under mechanical compression which, in turn, extends the range of effective mitigation of temperature changes. In additional embodiments, the NTE materials can be in the form of complex oxide nano-crystals mixed with a host material to form a composite. Examples of the host material can include, e.g., spin-on glass, inorganic siloxane or silicate materials.

In embodiments, the composite is used as a cladding layer locally or globally over temperature sensitive optical elements. For example, the composite material can be used in a local shallow trench isolation (STI) region under temperature-sensitive Si photonics (or CMOS) components, e.g., waveguide structures. In further embodiments, the composite material can be deposited under all photonic devices, or selectively only under or over critical temperature sensitive devices (e.g., by additive or subtractive patterning, local STI, etc.).

The structures of the present disclosure can be manufactured in a number of ways using a number of different tools. In general, though, the methodologies and tools are used to form structures with dimensions in the micrometer and nanometer scale. The methodologies, i.e., technologies, employed to manufacture the structures of the present disclosure have been adopted from integrated circuit (IC) technology. For example, the structures are built on wafers and are realized in films of material patterned by photolithographic processes on the top of a wafer. In particular, the fabrication of the structures uses three basic building blocks:

(i) deposition of thin films of material on a substrate, (ii) applying a patterned mask on top of the films by photolithographic imaging, and (iii) etching the films selectively to the mask.

Figure 1:
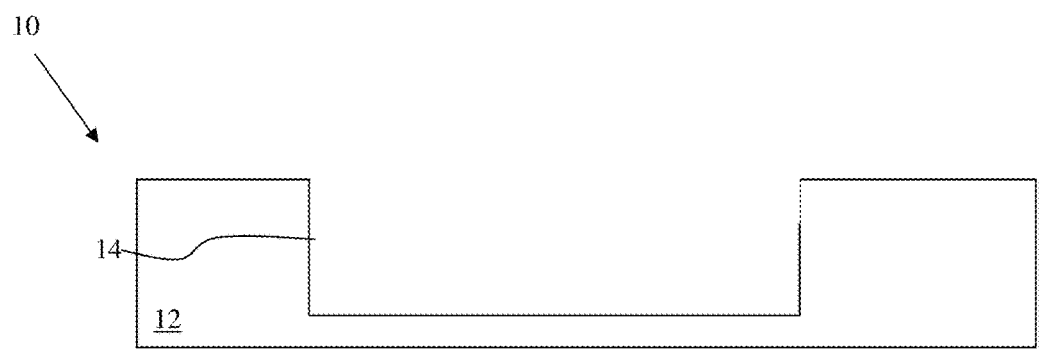
FIGS. 1-3 show structures and respective fabrication processes in accordance with aspects of the present disclosure.

FIG. 1 shows a structure and respective fabrication processes in accordance with aspects of the present disclosure. In particular, the structure 10 includes a substrate 12 comprising a trench 14. In embodiments, the substrate 12 can be a bulk Si; although other semiconductor materials are also contemplated herein. For example, the substrate 12 may be composed of any suitable material including, but not limited to, SiGe, SiGeC, SiC, etc.

In embodiments, the trench 14 can be formed as a local shallow trench isolation (STI) region using conventional lithography and etching processes. For example, a resist can be formed over the substrate 12 and exposed to energy (e.g., light) to form a pattern (opening). An etching process, e.g., reactive ion etching (RIE) with a chemistry selective to the substrate 12, can be performed through the opening to form the trench 14. In embodiments, the trench 14 can be about 2 μm deep; although other depths are also contemplated by the present disclosure. The resist can then be removed using conventional resist strips or oxygen ashing processes.

Figure 2:
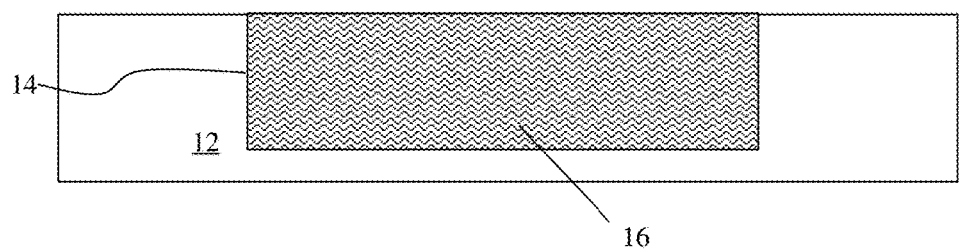

In FIG. 2, the trench 14 is filled with NTE material 16 in accordance with aspects of the present disclosure. In embodiments, the NTE material 16 can be graphene material preferably with a host material to form a composite material. For example, the NTE material can be a composite of $SiO_2$ host material combined with a selected NTE material (e.g., graphene). In embodiments, the NTE material 16 can be complex oxide nano-crystals. In embodiments, the NTE material 16 does not have to be transparent to the wavelength of interest as it is placed within the trench 14.

In more specific embodiments, the NTE material 16 can be any of the materials described herein. By way of example, the NTE materials contemplated herein include, but are not limited to:

graphene;

$ZrW_2O_8$, $HfW_2O_8$, $ZrMo_2O_8$, or substitution variations where the Zr site is replaced with Sc, Y, In, Eu, Er, Yb, or Lu;

$ZrV_2O_7$, or substitution variations where the V→P with Zr is replaced with Ti, U, Th, Pu, Np, Mo, W, Ce, Pb, Sn, Ge or Si; and/or $ScW_2O_{12}$, $TiO_2$ or liquid crystal materials.

As should be understood by those of skill in the art, graphene has a coefficient of thermal expansion (CTE) value of about $-7.3$ to $-8.7 \times 10^{-6}/k$, whereas, the other NTE materials described herein have a CTE ranging from about $-5.0$ to $-10.0 \times 10^{-6}/k$. This is compared to Si which has a CTE of about $2.0 \times 10^6/k$.

The NTE materials can be a powder mixed with a host material to form the composite. For example, the host material can include, e.g., spin-on glass, inorganic siloxane or silicate materials. In embodiments, the host material can be an inorganic silicon oxide host, which has a CTE of about 1.0 to $5.0 \times 10^6/k$. In embodiments, the inorganic silicon oxide host material allows higher curing temperatures leading to lower outgassing in the local STI region and reduced CTE of the host material.

In embodiments, the NTE material 16 (e.g., composite material) can be flowed into the trench 14 using any conventional deposition methods known to those of skill in the art. Any excess composite material (hereinafter referred generally as NTE material) on the surface of the substrate 12 can be removed using conventional chemical mechanical planarization (CMP) methods. Also, as in each of the embodiments described herein, the NTE material can be subjected to a heating process to remove (e.g., drive off) any carrier solvent, followed by a curing process compatible with Si.

Figure 3:
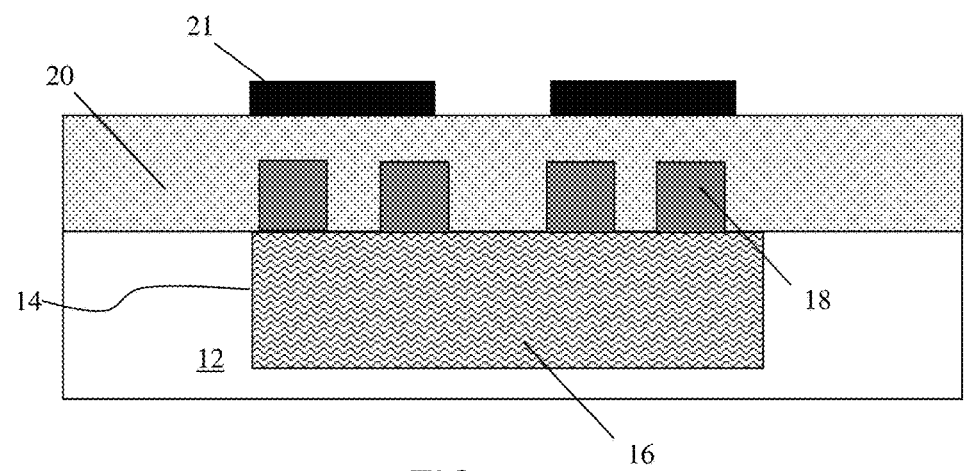

In FIG. 3, temperature-sensitive Si Photonics or CMOS components 18, e.g., Si waveguide structures, are formed above the STI region (e.g., NTE material 16). In embodiments, the temperature-sensitive Si Photonics or CMOS components 18 can be poly Si or SiN waveguides (e.g., ring or racetrack waveguide resonators), modulators, filters, MUX/DEMUX and/or couplers, as examples. The components 18 can be formed using conventional CMOS processes, including, e.g., deposition and patterning of Si material amongst other fabrication processes, as should be understood by those of skill in the art.

A cladding material 20 is deposited on the components 18 in accordance with aspects of the present disclosure. In embodiments, the cladding material 20 can be, e.g., $SiO_2$, SiN or NTE material as described herein. The cladding material 20 can be deposited over the components 18 using conventional chemical vapor deposition (CVD) processes. Optional heaters 21 can be formed on the cladding material 20 using conventional CMOS processes. In embodiments, the heaters 21 are provided over the components 18.

Figure 4:
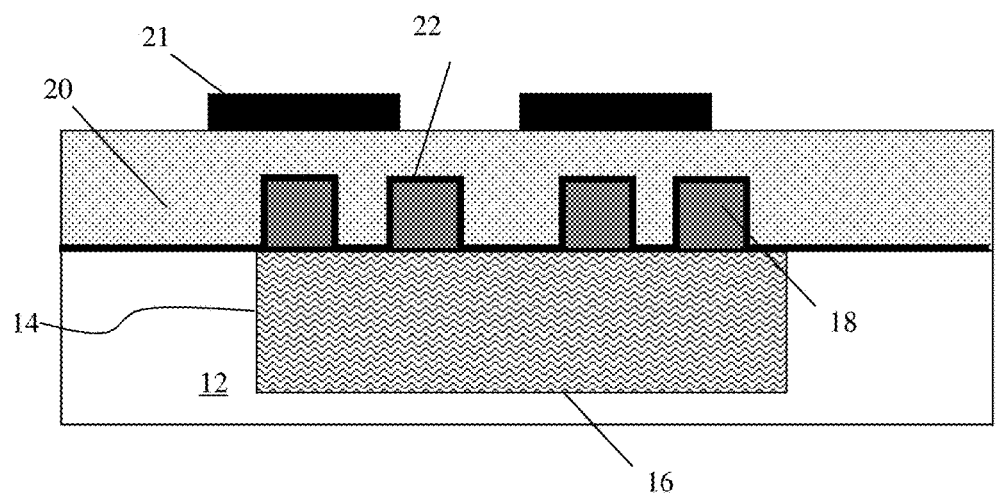
FIG. 4 shows structures and respective fabrication processes in accordance with other aspects of the present disclosure.

FIG. 4 shows an alternative embodiment in accordance with aspects of the present disclosure. In FIG. 4, an encapsulating material 22, e.g., oxide material, is formed over the components 18 to retain the photon containment within the component, e.g., Si waveguide. In embodiments, the encapsulating material 22 is a thermal oxide layer formed prior to the application of the NTE material.

In embodiments, the oxide material 22 can be formed by a conformal blanket deposition process, e.g., atomic layer deposition (ALD) or CVD, using $SiO_2$. In embodiments, the oxide material 22 can chemically insulate the components 18 from high atomic weight metals, e.g., NTE materials. In additional embodiments, the thickness of the oxide material 22 can vary depending on what type of NTE material is used as the cladding material 20. For example, a thinner oxide material can be used with a NTE material that has advantageous optical properties. In this case, for example, the thickness of the conformal oxide should be approximately equal to the depth of the evanescent wave in the conformal oxide. Optionally, heaters 21 can be formed on the cladding material 20 using conventional CMOS processes.

Figure 5:
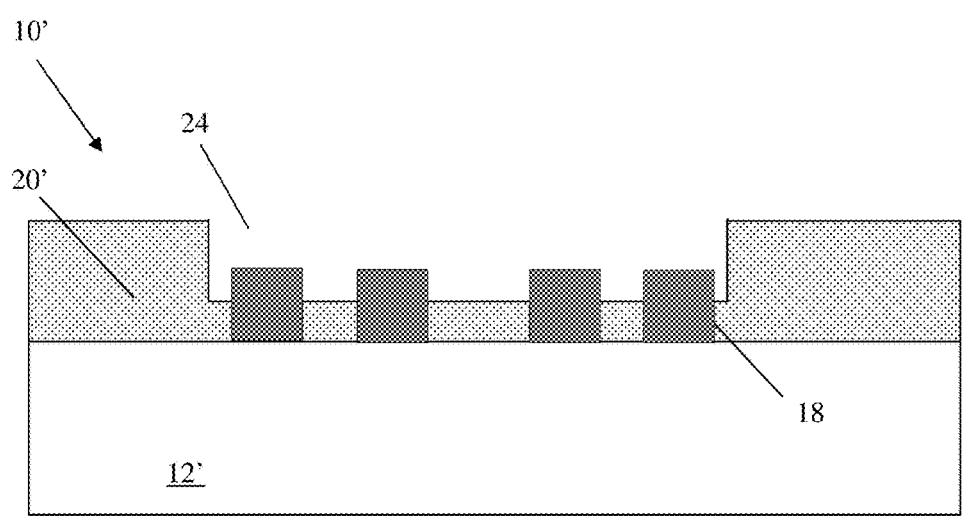
FIGS. 5 and 6 show structures and respective fabrication processes in accordance with additional aspects of the present disclosure.
Figure 6:
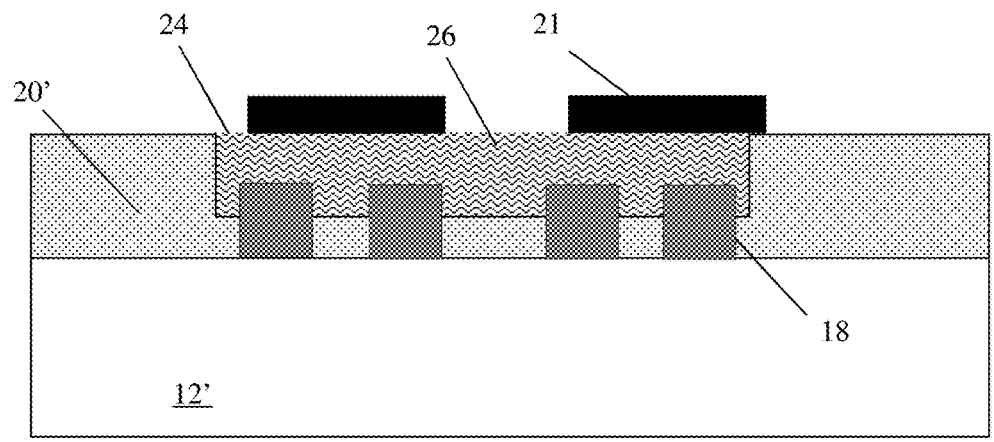

FIGS. 5 and 6 show alternative structures and respective fabrication processes in accordance with additional aspects of the present disclosure. In FIG. 5, the structure 10' includes a substrate 12' which can be silicon on insulator (SOI); although other semiconductor materials are also contemplated herein. In embodiments, the temperature-sensitive Si Photonics or CMOS components 18, e.g., waveguide structures, are formed from the semiconductor material of the SOI substrate 12'. In embodiments, the temperature-sensitive Si Photonics (or CMOS) components 18 can be Si waveguides (e.g., ring or racetrack waveguide resonators), modulators, filters, MUX/DEMUX and/or couplers, as examples. The components 18 can be formed using conventional CMOS processes, including, e.g., lithography and patterning of Si material amongst other steps as should be understood by those of skill in the art.

A cladding material 20' is deposited on the components 18. In embodiments, the cladding material 20' can be, e.g., $SiO_2$ or SiN. The cladding material 20' can be deposited over the components 18 using conventional chemical vapor deposition (CVD) processes.

Still referring to FIG. 5, a trench 24 is formed in the cladding material 20', exposing a portion or all of the components 18. In embodiments, the trench 24 can be formed by conventional lithography and etching processes. For example, a resist can be formed over the cladding material 20' which is exposed to energy (e.g., light) to form a pattern (opening). An etching process, e.g., RIE with a chemistry selective to the cladding material 20', can be performed through the opening to form the trench 24. In embodiments, the trench 24 can be about 2 µm deep; although other depths are also contemplated by the present disclosure to expose partially or entirely the components 18. The resist can then be removed using conventional resist strips or oxygen ashing processes.

As shown in FIG. 6, the trench 24 is filled with NTE material 26 in accordance with aspects of the present disclosure. In embodiments, the NTE material 26 can be any of the materials already described herein. For example, the NTE material 26 can be grapheme or other NTE material with a host material as described herein to form a composite material. For example, the NTE material can be a composite of SiO$_2$ combined with a selected NTE material.

In embodiments, the NTE material 16 can be flowed into the trench 24 using any conventional deposition methods known to those of skill in the art. As should be understood by those of skill in the art, in embodiments, the cladding material 20' will laterally constrain the NTE material 26, which will localize the benefits of the NTE material 26 above the components 18. Any excess NTE material 26 on the surface of the cladding material 20' can be removed using a conventional chemical mechanical planarization (CMP) method. Heaters 21 can be formed on the cladding material 20 using conventional CMOS processes.

Figure 7:
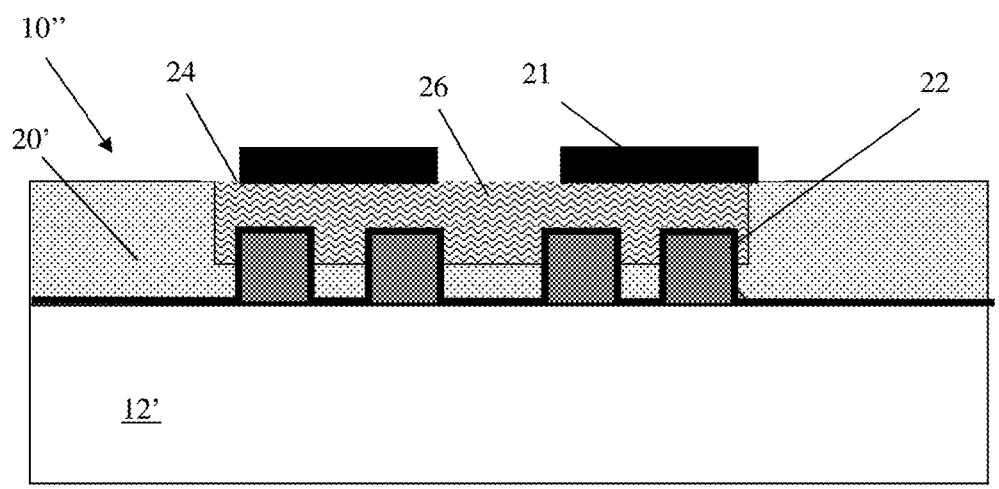
FIG. 7 shows structures and respective fabrication processes in accordance with yet additional aspects of the present disclosure.

FIG. 7 shows an alternative embodiment in accordance with aspects of the present disclosure. In FIG. 7, the structure 10" include an encapsulating material 22 formed over the components 18 shown in FIG. 6. As described already, the encapsulating material 22 can be an oxide material formed (e.g., clad) over the components 18 to retain the photon containment within the component, e.g., Si waveguide. In embodiments, the oxide material 22 is a thermal oxide layer formed prior to the application of the cladding material 20' and the NTE material 26.

In embodiments, the oxide material 22 can be formed by a conformal blanket deposition (e.g., ALD or CVD). And, as in each of the embodiments described herein, the oxide material 22 can chemically insulate the components 18 from high atomic weight metals, e.g., NTE material formed within the trench 24. In embodiments, the thickness of the oxide material 22 can vary depending on what type of NTE material is used as described herein. Optional heaters 21 can be formed on the cladding material 20 using conventional CMOS processes.

Figure 8:
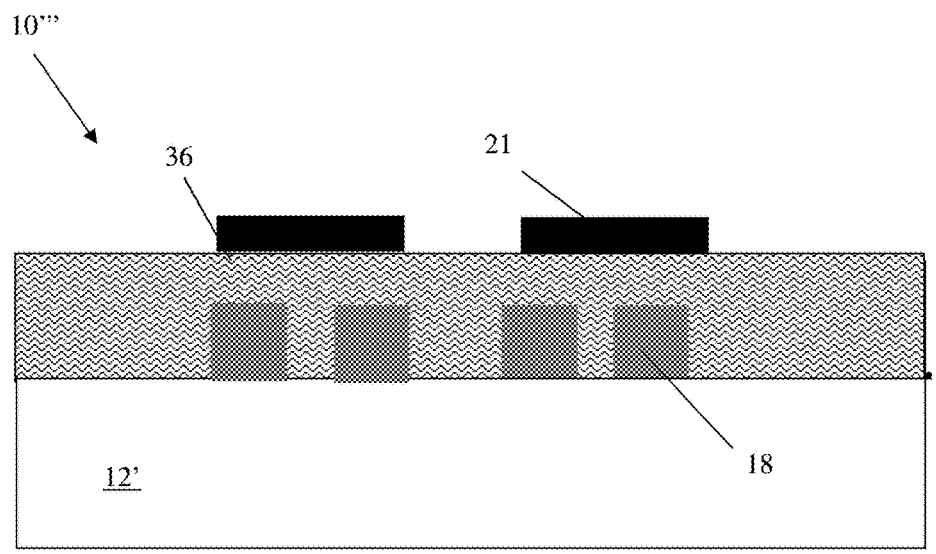
FIG. 8 shows structures and respective fabrication processes in accordance with still additional aspects of the present disclosure.

In alternate embodiments, as shown in FIG. 8, the structure 10''' includes cladding material 36 globally formed over the components 18 and the substrate 12'. In embodiments, the cladding material 36 is NTE material as described herein.

Figure 9:
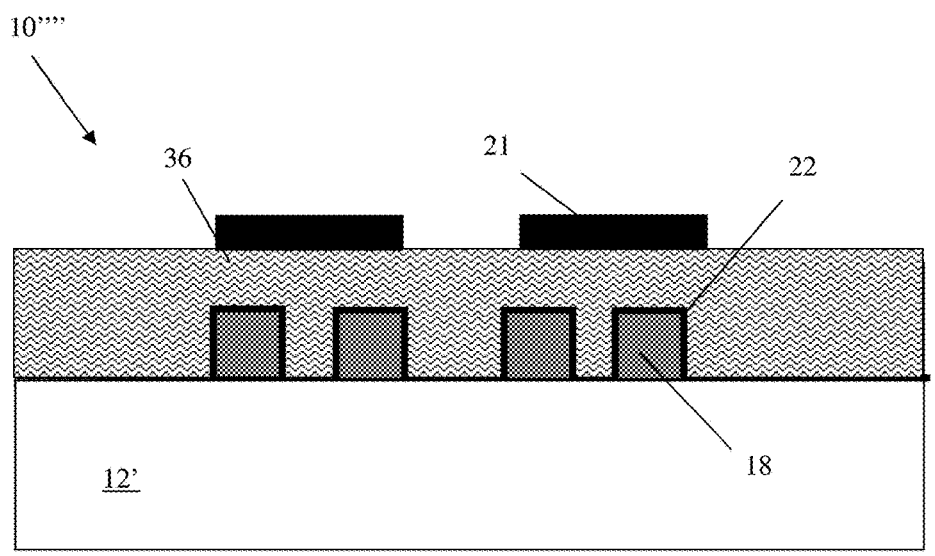
FIG. 9 shows structures and respective fabrication processes in accordance with still additional aspects of the present disclosure.

In another alternate embodiment, as shown in FIG. 9, the structure 10"" includes cladding material 36 globally formed over the components 18 and the substrate 12'. In embodiments, the cladding material 36 is NTE material as described herein. In this embodiment, the encapsulating material, e.g., oxide material 22, is formed over the components 18 of FIG. 6, prior to forming of the cladding material 36. In embodiments, the oxide material 22 can be formed by a conformal blanket deposition, e.g., ALD or CVD, which will chemically insulate the components 18 from high atomic weight metals, e.g., NTE material 36. The oxide material can be used for optical containment.

As should be understood by those of skill in the art, the NTE materials described herein, which are provided over the components 18 and/or under the components 18 (in the STI region), will reduce the impact of temperature changes on the component critical performance (e.g. resonance shift). More specifically, in embodiments, the use of about 30% to about 50% of graphene or other NTE materials in the local STI region, for example, will significantly off-set thermal expansion of the host material and the Si material used for the components 18. This will reduce or eliminate the need for heaters and control circuits used in current integrated Si photonics which, in turn, significantly reduces energy dissipation/bit of data transferred. In embodiments, the NTE materials will also constrain the expansion of the components, particularly when they are configured as micro-rings. This will ensure that the micro-rings remained in proper tune. That is, the resonant frequency, usually denoted in terms of wavelength of the waveguide resonator, will remain aligned with the wavelength of the expected optical signals passing there through, otherwise the modulator or filter performance will be degraded.

The method(s) as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:
1. An integrated photonics structure, comprising:
 a localized region of negative thermal expansion (NTE) coefficient material formed within a trench;
 at least one photonics or CMOS component contacting with the negative thermal expansion (NTE) coefficient material; and
 cladding material formed above the at least one photonics or CMOS component,
 wherein the NTE coefficient material is graphene formed within a localized trench of a substrate, under the at least one photonics or CMOS component.

2. The integrated photonics structure of claim 1, wherein the at least one photonics or CMOS component comprises at least one of a waveguide, modulator, filter, MUX/DEMUX, and coupler.

3. The integrated photonics structure of claim 1, wherein the trench with the NTE coefficient material is formed within a localized shallow trench region of a substrate.

4. The integrated photonics structure of claim 1, wherein the cladding material comprises inorganic silicon oxide.

5. The integrated photonics structure of claim 4, further comprising an oxide material encapsulating the at least one photonics or CMOS component.

6. The integrated photonics structure of claim 1, wherein the NTE coefficient material includes a host material comprising inorganic silicon oxide material.

7. The integrated photonics structure of claim 1, further comprising an oxide material encapsulating the at least one photonics or CMOS component.

8. An integrated photonics structure, comprising:
   at least one photonics or CMOS component on a substrate;
   an encapsulating material encapsulating the at least one photonics or CMOS component; and
   a region of negative thermal expansion (NTE) coefficient material which is located to reduce impact of temperature changes on performance of the at least one photonics or CMOS component,
   wherein the encapsulating material is oxide material and the NTE coefficient material is formed within a shallow trench region formed in the substrate, and
   wherein the NTE coefficient material is graphene mixed with a host material.

9. The integrated photonics structure of claim 8, further comprising a cladding material formed over the at least one photonics or CMOS component.

10. The integrated photonics structure of claim 8, wherein the host material is an inorganic silicon oxide material.

11. The integrated photonics structure of claim 8, wherein the negative thermal expansion (NTE) coefficient material reduces the impact of temperature changes on resonance shift of a waveguide structure.

12. An integrated photonics structure, comprising:
    at least one photonics or CMOS component on a substrate;
    cladding material formed above the at least one photonics or CMOS component;
    an encapsulating material encapsulating the at least one photonics or CMOS component; and
    a negative thermal expansion (NTE) coefficient material mixed with a host material surrounding the at least one photonics or CMOS component,
    wherein the NTE coefficient material is formed within a localized region of the cladding material, above the least one photonics or CMOS component.

13. The integrated photonics structure of claim 12, wherein the NTE coefficient material is one of:
    (i) $ZrW_2O_8$, $HfW_2O_8$, $ZrMo_2O_8$, or substitution variations where the Zr site is replaced with Sc, Y, In, Eu, Er, Yb, or Lu;
    (ii) $ZrV_2O_7$, or substitution variations where the V→P with Zr is replaced with Ti, U, Th, Pu, Np, Mo, W, Ce, Pb, Sn, Ge or Si; and
    (iii) $ScW_2O_{12}$, $TiO_2$ or liquid crystal materials.

14. The integrated photonics structure of claim 12, wherein the encapsulating material is oxide material and the NTE coefficient material is formed within a shallow trench region formed in the cladding material above the least one photonics or CMOS component.

15. The integrated photonics structure of claim 12, wherein the negative thermal expansion (NTE) coefficient material reduces impact of temperature changes on resonance shift of a waveguide structure.

16. The integrated photonics structure of claim 12, wherein the negative thermal expansion (NTE) coefficient material is a powder mixed with the host material of inorganic silicon oxide.

17. The integrated photonics structure of claim 12,
    wherein the NTE coefficient material includes a host material comprising inorganic silicon oxide material, and
    wherein the NTE coefficient material is graphene formed within a localized trench of the substrate.

* * * * *